US008660558B2

(12) United States Patent
Kazmi et al.

(10) Patent No.: US 8,660,558 B2
(45) Date of Patent: Feb. 25, 2014

(54) METHOD FOR LOAD BALANCING OF DEVICES IN IDLE MODE

(75) Inventors: Muhammad Kazmi, Bromma (SE); Gabor Fodor, Hässelby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 862 days.

(21) Appl. No.: 12/438,517

(22) PCT Filed: May 4, 2007

(86) PCT No.: PCT/SE2007/050304
§ 371 (c)(1),
(2), (4) Date: Aug. 17, 2010

(87) PCT Pub. No.: WO2008/024055
PCT Pub. Date: Feb. 28, 2008

(65) Prior Publication Data
US 2010/0304747 A1    Dec. 2, 2010

(30) Foreign Application Priority Data
Aug. 22, 2006  (SE) .................................. 0601717

(51) Int. Cl.
*H04W 36/00* (2009.01)
*H04B 7/00* (2006.01)
*H04L 1/00* (2006.01)

(52) U.S. Cl.
USPC .......... 455/436; 455/509; 455/561; 370/252; 370/347; 379/133

(58) Field of Classification Search
USPC .............. 455/509, 561, 436, 403, 405–409, 455/449–453; 370/252, 347; 379/133
See application file for complete search history.

(56) References Cited

U.S. PATENT DOCUMENTS

| | | | | |
|---|---|---|---|---|
| 6,047,052 A | * | 4/2000 | Sakai et al. | 379/133 |
| 6,418,136 B1 | * | 7/2002 | Naor et al. | 370/347 |
| 7,099,283 B2 | * | 8/2006 | Matta et al. | 370/252 |
| 8,155,681 B2 | * | 4/2012 | Iwamura et al. | 455/509 |
| 2006/0183482 A1 | * | 8/2006 | Ueda | 455/439 |

FOREIGN PATENT DOCUMENTS

WO    WO 2008/023609    *  2/2008

* cited by examiner

*Primary Examiner* — Jinsong Hu
*Assistant Examiner* — William Nealon

(57) ABSTRACT

The invention discloses a method for a cellular communications system, in which there is a first plurality of cells and a second plurality of base stations, each base station controlling the traffic to and from user terminals in a cell. User terminals can assume an idle mode, where a user terminal when in an idle mode performs cell reselection, comprising an evaluation of the cells which are available to the user terminal. The base stations of a number of cells in the system transmit a set of reselection probabilities, each probability in said set being the probability with which a terminal when in idle mode may carry out a reselection from its present cell to the cell to which the probability refers.

17 Claims, 5 Drawing Sheets

METHOD FOR LOAD BALANCING OF DEVICES IN IDLE MODE

TECHNICAL FIELD

The present invention discloses a method and a device by means of which load balancing between devices in idle mode in a cellular wireless telecommunications system may be improved upon.

BACKGROUND

In many wireless cellular telecommunications systems such as, for example, UTRAN, (Universal Terrestrial Radio Access Network), GSM (Global System for Mobile Communication, EDGE, (Enhanced Data Rates for Global Evolution, and LTE (Long Term Evolution) networks, user terminals can assume a state which is sometimes referred to as "idle mode", i.e. a state in which a terminal is dormant or inactive.

In order to ensure that user terminals which are in the idle mode are camped on the correct cell regardless of mobility and variations in radio conditions, there exists a procedure known as cell reselection, by means of which a terminal which is in idle mode may choose a different cell than its present one. The cell reselection procedure which is thus used by user terminals in idle mode can roughly be said to correspond to the handover procedure that is used by the terminals in the active mode. However, for idle mode user terminals, the system or network does not have a control channel by means of which it can order individual user terminals to execute cell reselection.

In many systems, parameters related to cell reselection are transmitted by the base stations of the various cells in the system. The parameters which are broadcast can include, for example, lists of cells that the terminals may reselect, minimum threshold required in order to reselect a particular cell etc.

The idle mode terminals perform downlink measurements on reference symbols such as, in UTRAN, CPICH (Common Pilot Indication Channel) from the different cells that are included in the broadcast list, both regarding received signal strength and signal quality, i.e. interference on the channel. The cycle or intervals with which the terminals make these measurements may also be one of the parameters which are broadcast by the base stations of the cells.

Based on, inter alia, these measurements, the terminals may either reselect a new cell or remain camped on its present cell. If a new cell is reselected, the terminal will, in some systems, send a cell update message to the network in order to allow it to keep track of the terminal's location. This is done in order to ensure that the terminal correctly receives paging and that it will be able to initiate a call without unnecessary signal degradation.

As can be realized from the explanation above, inappropriate cell reselection will increase the call blocking probability upon idle-to-active transition of a user terminal, thereby degrading the service performance of the system. Thus, proper cell reselection is an essential and important feature in cellular systems.

In addition, in many locations, such as, for example so called "hot spots", an operator may deploy more than one cell in the same geographical area, so that there will be more than one cell in one sector, with the cells having at least a partial overlap. Such cells are also sometimes referred to as co-located cells, a term which will be used in this text. The term 'co-located cells' is here used as a generic term, and should thus be understood as referring to both so called inter frequency cells, i.e. cells which are co-located on one and the same base station but with different operating frequencies, as well as cells which are co-located by means of belonging to different systems, such as, for example, UTRAN and GERAN.

Another factor that makes proper cell reselection for idle mode terminals an important feature in a wireless cellular telecommunications system is that it is often undesirable to be forced to make a handover of a terminal to another cell immediately when a terminal has gone from idle mode to an active state.

SUMMARY

As has emerged form the explanation given above, there is a need for a method by means of which proper cell reselection for idle mode terminals in a cellular wireless communications system can be performed in a proper manner.

In particular, it would be desirable for a method by means of which the system or network could balance the idle mode load (i.e. the number of camping mobile terminals) between cells, since it is the system or network that has "global" knowledge about the current radio resource situation.

This need is addressed by the present invention in that it discloses a method for use in a cellular wireless communications system, in which system there is a first plurality of cells and a second plurality of base stations.

In a system in which the invention may be applied, each base station controls the traffic to and from user terminals in a cell, and user terminals in the system can assume an idle mode. Such a user terminal may, when going from an idle mode, perform a cell reselection procedure which comprises an evaluation of the different cells which are available to the user terminal, and the method of the invention comprises the step of letting the base stations of a number of cells in the system transmit a set of reselection probabilities, with each probability in the set being the probability with which a terminal when coming out of idle mode may carry out a reselection from its present cell to the cell to which the probability refers.

Thus, by means of the invention, the system may more accurately than at present direct the reselection process of terminals which are in idle mode, so that their cell reselection more accurately reflects, for example, the cell load of the different cells in the system.

This, and other advantages of the present invention, will be realized even more clearly by means of the following detailed description of the invention.

The invention also discloses a user terminal which may carry out the cell reselection of the invention, and also discloses a base station for use with the invention.

BRIEF DESCRIPTION OF THE DRAWINGS

The invention will be described in more detail with reference to the appended drawings, in which.

DETAILED DESCRIPTION

Figure 1:
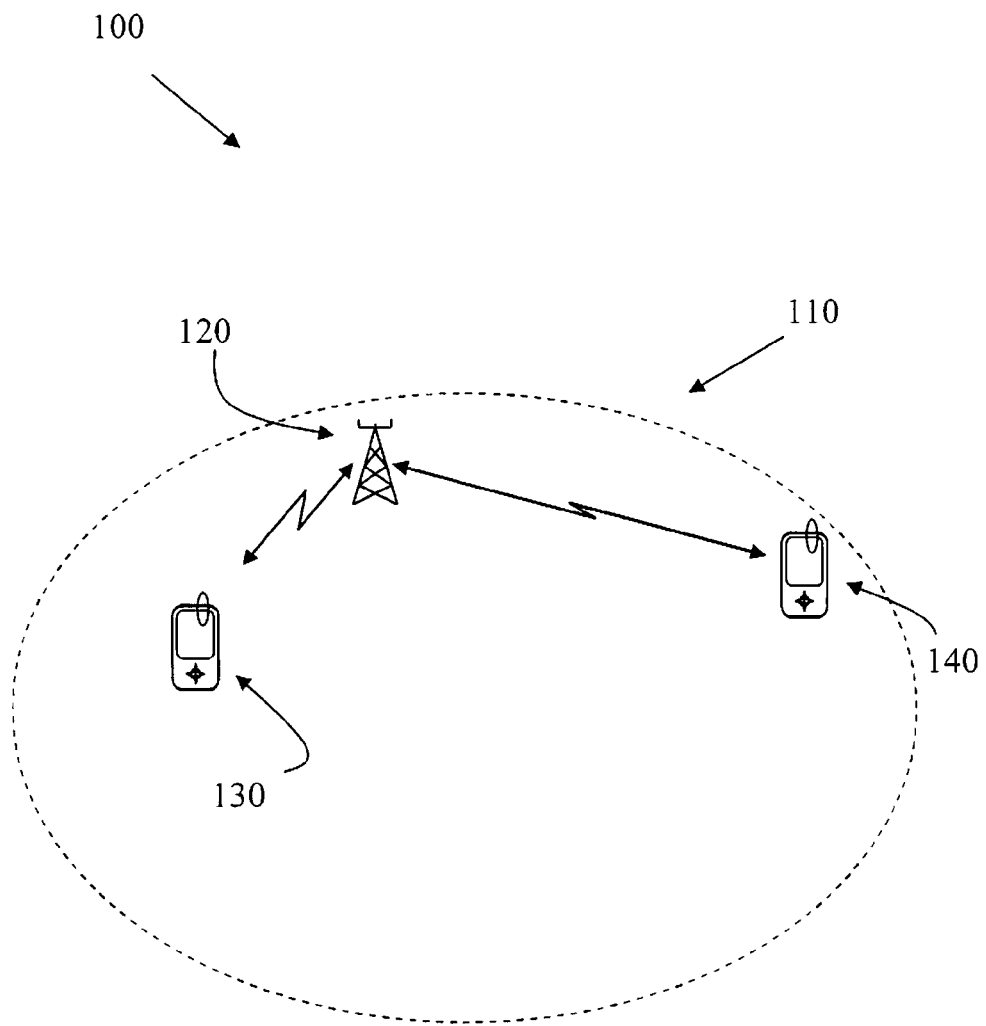
FIG. 1-3 show different system in which the invention may be applied.

FIG. 1 shows a part of a system 100 in which the invention may be used. As shown in FIG. 1, in the system 100 there may be a number of cells, one of which is shown in FIG. 1 as 110, and there is also a number of base stations, one of which is shown as 120 in FIG. 1. In the system 100, each base station controls the traffic to and from user terminals in a cell.

Before any further description is given of the invention, it should be mentioned that the invention can be applied to a large number of wireless cellular telecommunication systems, as will be realized by those skilled in the art. Thus, although the description of the invention will be made by means of terms which may be specific to a certain system or standard, this is merely in order to facilitate for the reader, and is not intended to restrict the scope of protection sought for the present invention. For example, the term "base station" will be used in this text as a generic term for a node in the system which controls to and from users in a cell. In some systems, this node is referred to as "base transceiver station", or Node B, or eNodeB. The invention can be used in such systems as well. Similarly, the term "user terminal" is intended as a generic term, which in some systems instead is referred to as User Equipment, UE, or Mobile Station, MS.

Returning now to the system shown in FIG. 1, as stated previously in this text, an inactive user terminal may after a certain period of time assume a state which is referred to as "idle mode". In order for the user terminal to be able to be camped on the proper cell even when it is in its idle mode, there is, as explained previously, a so called reselection procedure.

Figure 2:
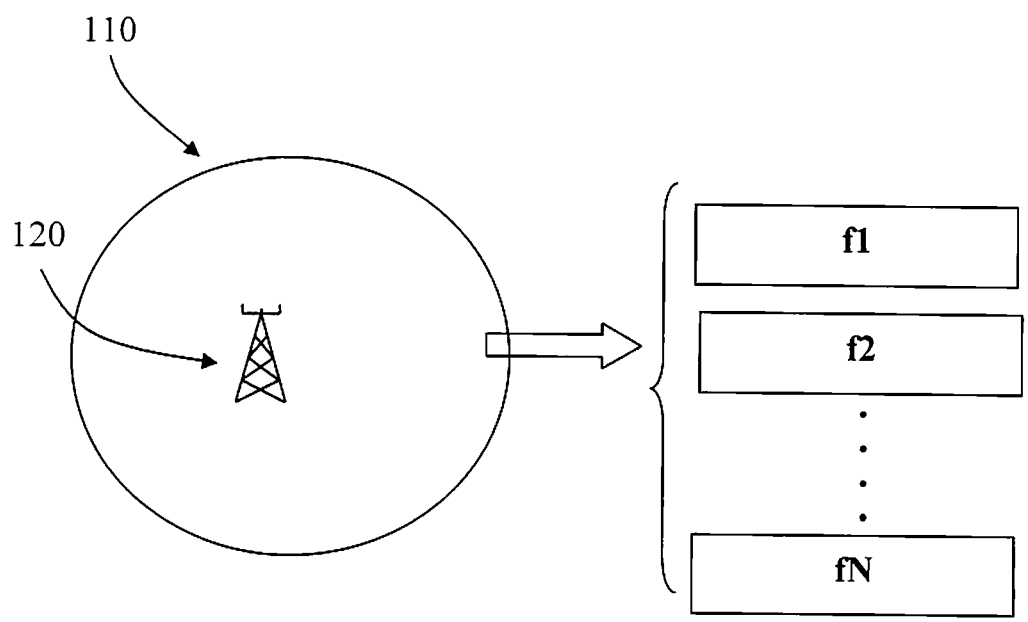

The present invention is in particular intended for applications in which a number of cells are co-located, a term which will be explained with reference to FIG. 2. In FIG. 2, the system 100 from FIG. 1 is shown, but in this application the base station 120 has a plurality of cells 110 co-located to it. In other words, the base station 120 serves a number of cells, each of which has, as shown in FIG. 2, an operating frequency, the operating frequency of cell number N being shown in FIG. 2 as $f_N$. However, the term "co-located cells" should not be taken to refer only to the kind of co-location shown in FIG. 2 which is a technology frequently used in the UTRAN system. The invention may also be used with cells that are co-located by means of belonging to different access technologies or systems, such as UTRAN and GERAN.

The reselection procedures for idle mode terminals which are available at present involve different measurements being made by the terminals. However, present technologies do not take into account the fact that different cells may have a different traffic load, thus making it more or less suitable for a terminal to reselect to a certain cell. This is a problem which is addressed by the present invention in the following manner:

the system broadcasts access probabilities which, inter alia, reflect the different loads in different co-located cells, UEs in idle mode use the broadcast access probabilities when reselecting cells.

The use of access probabilities, as will also be seen in the following description, allows for a high degree of freedom regarding the distribution of idle mode UEs in different co-located cells, i.e. idle mode load balancing, even in the case that all measured cell reselection related parameters are within a certain limit or nearly the same, which may be the case, for instance, in a scenario with a single base station with multiple co-located cells.

The invention will now be explained with reference to the system of FIG. 2, i.e. multiple cells on different frequencies but on one and the same base station. However, this is merely in order to facilitate the reader's understanding, the invention may also be applied for systems with other kinds of co-location for different cells, as will be shown later in this text.

Suitably, the information which is broadcast as described above is used as supplementary information, i.e. the information is suitably used in conjunction with other, existing information which is also intended for use in cell reselection.

The access probability mentioned previously in this text is preferably designed as follows:

Let $P_X$ be a vector containing the access probability for each co-located cell. The vector $P_X$ is broadcast by each co-located cell and is the probability with which a terminal is allowed to reselect a particular cell. Accordingly, for N co-located cells $P_X$ will be a one dimensional vector such that:

$$P_X = [p_1, p_2, p_3, \ldots p_N] \quad (1)$$

In (1), $p_j$ is the access probability for cell j, and the sum of all the elements in $P_X$ is 100%, if the different $p_j$ are expressed as percentages.

In an alternative embodiment of the invention, $P_X$ may also express different probabilities for reselecting one and the same cell based on different factors such as quality of service, user class etc.

In such an embodiment, $P_X$ could be depicted as a two dimensional vector. If an "additional factor" used in $P_X$ is, for example, the class of quality of service, QoS, and there are M different QoS, with N co-located cells, Px can be seen as:

$$P_x = \begin{bmatrix} p_{11}, p_{12}, \Lambda, p_{1N} \\ p_{21}, p_{12}, \Lambda, p_{1N} \\ M \\ p_{M1}, p_{M2}, \Lambda, p_{MN} \end{bmatrix} \quad (2)$$

Using a different access probability per service class and per cell according to (2) above will allow the terminals to reselect the cell which would provide the best coverage for the desired service. The approach in (2) is preferably used in applications where the terminals are able to predict their intended service or QoS when switching to active mode.

The "two-dimensional" access probability matrix of (2) can also advantageously be used to differentiate between e.g. so called "gold", "silver" or "bronze" users. In such an application, case different access probability vectors can be employed for the different user classes. This technique allows for an arbitrary distribution of users belonging to certain service classes, for instance, all "gold" users should not be camped on the same cell. In other words, load balancing on a per-class basis may be desirable, and can be obtained by means of the present invention.

When it comes to determining the different access probabilities, this can be done in a number of ways, as will be realized by the man skilled in the art. Examples of how the probabilities may be determined are 1. Set equal access probabilities for all of the cells in the vector Px, or
2. Let the base station determine the access probability for each cell based on the active number of relative users or one or more other parameters which reflect the traffic load in the different cells, such as, for example, the total average transmitted power per base station, the total average transmitted power per cell, the resource block usage etc. In the case shown in FIG. 2, where all of the cells are within the same base station, these access probabilities can be determined by the base station itself By means of option 2, it is possible to achieve load balancing even in transient situation where the load due to active terminals could cause a higher load in some cells than in the others. This situation could occur, for instance, if a large number of terminals enter a cell due to handover. Another possibility is to set unequal access probabilities for the different cells in order to achieve a more or less arbitrary load distribution of idle terminals in different cells.

In a particularly preferred embodiment of the invention, there is a function which serves to avoid simultaneous cell reselection by all user terminals in a cell. This function is preferably embodied as a factor which is broadcast by the base stations involved, with the factor being expressed as a probability factor for cell reselection. This factor can also be seen as a hysteresis probability, $P_H$, and is thus the probability with which the terminals will attempt cell reselection. $P_H$ is preferably common to all co-located cells, but it may also be specific to each cell, in which case $P_H$ will be a one-dimensional vector.

In a system in which the present invention is applied, the parameters of the invention are suitably but not necessarily applied by the terminals in the reselection process along with the other parameters that are used in the system for reselection. In other words, a normal cell reselection process in a system in which the invention is used could looks as follows:

The terminals evaluate the cell reselection process periodically in accordance with the parameters that are broadcast by the base stations for the cells involved. The terminals then attempt cell reselection provided that "the elementary conditions", such as signal strength criteria etc are fulfilled.

This will usually mean that the terminals attempt to reselect a cell whose quality level is above a certain threshold, as determined by the information broadcast for the different cells, and that the parameters of the invention are normally used only to choose between cells that are "otherwise equal", e.g. with reference to signal strength. Among co-located cells which fulfill those criteria, e.g. whose quality is above a certain threshold and are essentially equal in that respect, the terminals will in addition use the following rules:

The terminals attempt to perform cell reselection with the hysteresis probability $P_H$, in order to prevent all terminals from performing cell reselection simultaneously. Terminals that qualify for cell reselection according to $P_H$ will then reselect a cell according to the access probability vector $P_X$.

Figure 3:
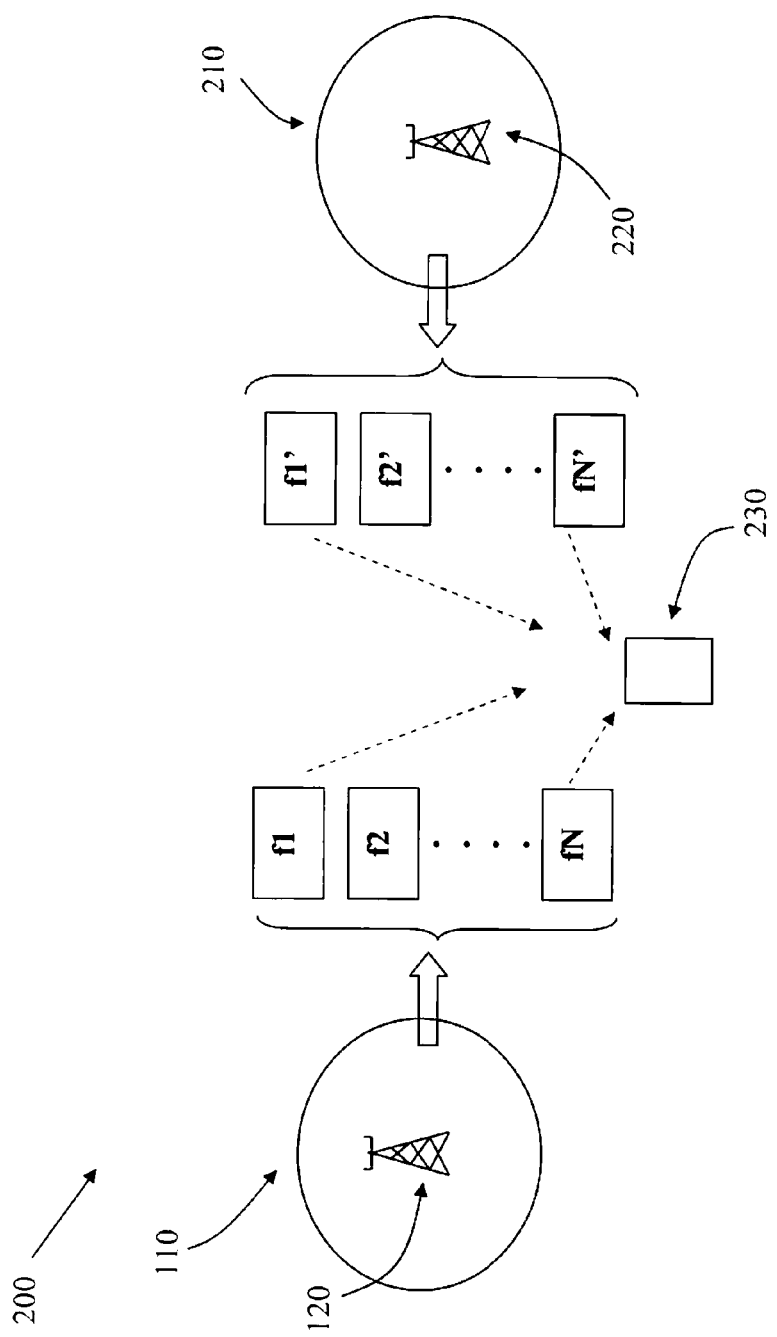

The invention has so far mostly been described with reference to a case where the different co-located cells are co-located on one and the same base station, i.e. the base station 120 of FIGS. 1 and 2. However, the invention may also be applied to a case with cells which overlap each other in coverage without being co-located on one and the same base station, as shown in FIG. 3, which shows two base stations 120, 220, each of which has at least one cell on at least one frequency or spectrum $f_1$-$f_N$; $f_1'$-$f_N'$, with the cells overlapping in an area in which the terminal 230 is located.

The case shown in FIG. 3 may occur, due to, for example, movement by the terminal 230. The principle explained in conjunction with FIG. 2 may thus also be applied to the case of FIG. 3, with the purpose of distributing idle mode terminals statistically equally in different cells. The procedure will essentially be as follows:

The cells of both base stations 120,220, both broadcast the access probability vector $P_X$ as well as, suitably, the hysteresis probability $P_H$, as explained above. The terminal 230 receives $P_X$ and $P_H$ from both base stations 120, 220, and reselects an appropriate cell accordingly.

It should be noted that, as before, the terminal 230 will suitably only attempt to reselect those cells for which the "normal" reselection conditions such as e.g. quality level and signal strength above a certain threshold etc. are fulfilled. This can also be expressed as saying that the parameters of the invention are suitably but not necessarily only applied in the reselection process if two cells are "otherwise equal" with respect to the reselection parameters used in the system 100, 200.

It can also be mentioned that the present invention may also be used for a reselection process in which two co-located (FIG. 2) or overlapping (FIG. 3) cells belong to different systems or access technologies, such as for example, two cells which belong to different systems, the different systems for example being from the group of E-UTRA, UTRA and GERAN.

Another case to which it would be possible to apply the invention is a scenario where at least two cells are not located at the same geographical location, i.e. they belong to different base stations, and it is desired to balance the load between the different base stations. The invention is applicable for this scenario as well, i.e. "inter base station" load balancing, however with at least one difference: This kind of load balancing would require exchange of load information between the base stations in order to determine the access probabilities, and suitably also the hysteresis probability.

Thus, by means of the invention, it is possible to achieve at least the following advantages:
Ensure that idle mode terminals are evenly distributed in different co-located cells,
Prevent resource bottlenecks when terminals switch from idle mode to an active mode, thereby reducing call blocking and dropping,
Prevent unnecessary delays at call setup if the network has to change cell due to lack of resources.

Thus, the combination of the cell reselection attempt probability or hysteresis probability $P_H$ and the access probabilities $P_X$ allow the radio access network to control and tune how fast the load distribution should change, and also to control the target distribution of the load for idle mode mobile terminals. In broad terms, the cell reselection probability $P_H$ controls the response time of the system to changing load situations, whereas the access probabilities $P_X$ control the stationary idle load distribution without requiring the network to control the mobile terminals individually.

In addition, in one embodiment of the invention, the network may use a time period value which decides how often the user terminals should evaluate whether or not a cell reselection should be performed according to the reselection attempt probability $P_H$.

Thus, in an embodiment which uses both the reselection probability $P_H$ and a timer value, a scenario would look like this:
The system broadcasts the cell reselection attempt probability or probabilities $P_H$ (also referred to as the hysteresis probabilities) that prescribes the probability with which the user terminals should attempt to execute a cell reselection procedure.
The system also broadcasts a time period value, which prescribes how often the user terminals should evaluate (according to the reselection attempt probability $P_H$) if a cell reselection should be performed. For instance, a combination of a timer value of 10 seconds and $P_H$=0.1 prescribes that user terminals should evaluate if a cell reselection attempt should be done or not every $10^{th}$ second, and the probability that the outcome of this evaluation is positive should be 0.1.
The system broadcasts access probabilities $P_X$ which, inter alia, reflect the different loads in different co-located cells,
User terminals in idle mode use the broadcast access probabilities when reselecting cells.

Figure 4:
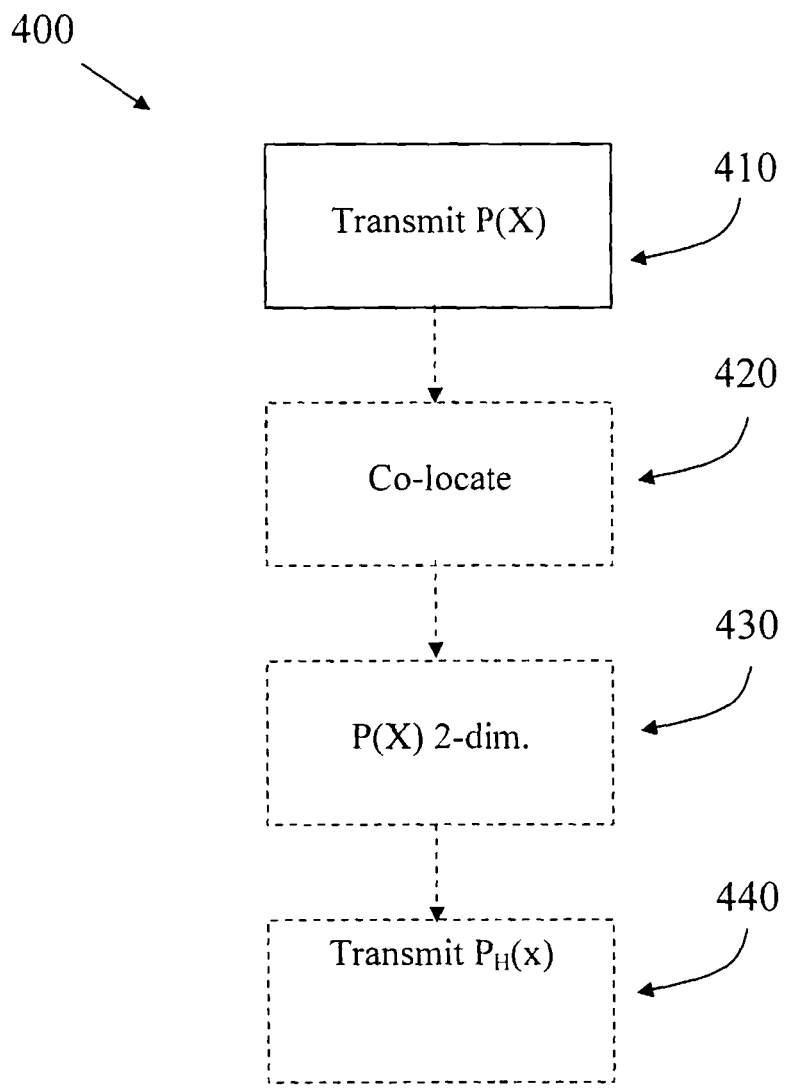
FIG. 4 shows a schematic flow chart of a method of the invention.

FIG. 4 shows a basic flow chart of some of the steps of a method 400 of the invention. Steps which are options or alternatives are shown with dashed lines. Step 410 shows that in a cellular wireless communications system with a number of base stations, at least some of the base stations transmit a set of reselection probabilities $P_X$, with each probability in said set being the probability with which a terminal when coming out of idle mode may carry out a reselection from its present cell to the cell to which the probability refers.

Step 420 shows that at least some of the base stations which transmit reselection probabilities may have more than one cell co-located to them, i.e. to one and the same base station.

Step 430 shows that the probabilities in the set of reselection probabilities may express different probabilities for reselecting one and the same cell based on a factor such as quality of service or user class, so that the set of probabilities can be depicted as a two dimensional vector.

Step 440 shows that the base stations which transmit reselection probabilities may also transmit a factor $P_H$, which serves to avoid simultaneous cell reselection by user terminals in a cell.

Figure 5:
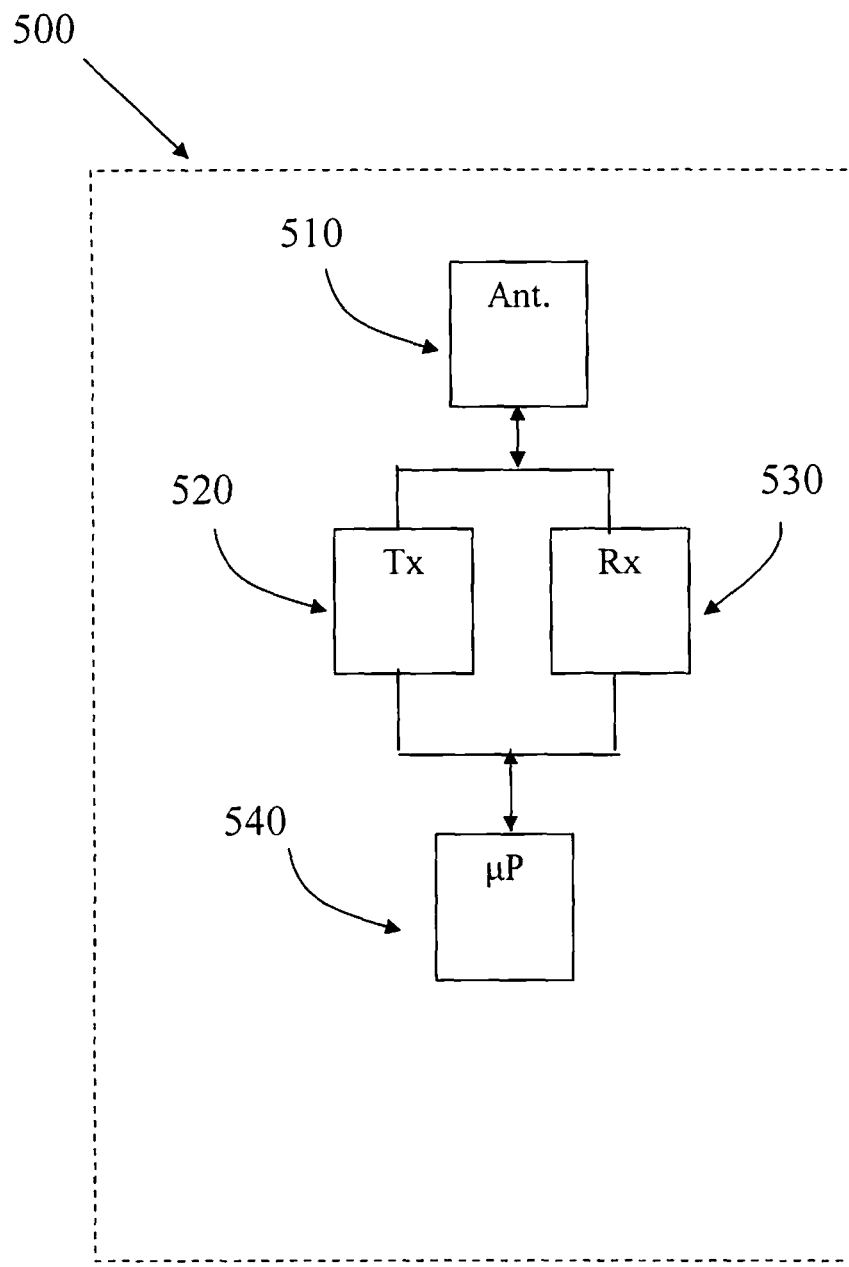
FIG. 5 shows a block diagram of a device of the invention.

FIG. 5 shows a basic block diagram of a base station 500 of the invention. As shown in FIG. 5, the base station 500 comprises means 540 for determining and means 520 for transmitting the reselection probabilities described previously in this text. Suitably, the means 540 for determining the probabilities are a microcomputer or some other such computational device. The transmitting means 520 are suitably the ordinary transmitter of the base station 50.

The base station 500 can have more than one cell co-located to it.

The determining means 540 also suitably serve to determine the hysteresis factor $P_H$ which has been described previously in this text. This factor is then suitably transmitted by the same transmitter 520 as the reselection probability $P_X$.

If the sets of reselection probabilities are transmitted as broadcast messages by the base station 500, the transmitter 520 is suitably used for this purpose Also shown in FIG. 5 is the receiver 530 of the base station 500, as well as the antenna 510 of the base station.

FIG. 5 can also be used to roughly illustrate a user terminal 500 according to the invention, according to the following description: a user terminal 500 of the invention is equipped with means 540 for, when going from its idle mode, performing a cell reselection procedure comprising an evaluation of the different cells (f1-fN, f1'-fN') which are available to the user terminal 500. Said means are suitably a microcomputer, as shown in FIG. 5, or some other computing or calculating means.

The user terminal 500 also comprises means 530 for receiving and means 540 for using a set of reselection probabilities, which have been described previously. The means for using the reselection probabilities are suitably but not necessarily the same as the means for performing the rest of the reselection procedure.

The way that the reselection probabilities are used by the user terminal 500 may be as follows: each probability is expressed as a percentage, i.e. a number ranging from 0-100, or alternatively, from 0.00 to 1.00 The means 540 then produce a random number in the same range, but with a desired distribution function, suitably an even probability distribution over the entire range. Depending on the random number which is produced, a cell with the corresponding probability number is chosen for reselection.

The means 530 for receiving and 540 for using the probabilities in the set of reselection probabilities may suitably be designed to handle different probabilities for reselecting one and the same cell based on a factor such as quality of service or user class, so that the set of probabilities which is received and used can be depicted as a two dimensional vector.

Also, in the user terminal 500, the means 530 for receiving and 540 for using the probabilities in the set of reselection probabilities may in one embodiment be designed to receive and use the factor $P_H$, which serves to avoid simultaneous cell reselection by user terminals in a cell.

The factor $P_H$ can be used expressed as a probability factor for cell reselection, in which case the random number procedure described previously may be applied when using this factor as well.

Also, the means 530 for receiving and 540 for using the probabilities in the set of reselection probabilities may be designed to receive and use the sets of reselection probabilities if they are transmitted as broadcast messages.

As shown in FIG. 5, the user terminal 500 will also usually comprise a transmitter 520 and an antenna 510.

The invention claimed is:

1. A method for use in a cellular wireless communications system, in which the cellular wireless communications system there is a plurality of cells and a plurality of base stations, with each base station controlling traffic to and from user terminals in a cell, and in which the user terminals can assume an idle mode, where a user terminal when in an idle mode may perform a cell reselection procedure, comprising:
   evaluating different cells which are available to the user terminal when in the idle mode;
   receiving messages from the plurality of base stations of a number of the plurality cells in the cellular wireless communications system, the messages comprising a set of reselection probabilities, each reselection probability in the set being a probability with which the user terminal when transitioning from the idle mode may carry out a reselection from a present cell to a cell to which the probability refers; and
   using the set of reselection probabilities for performing cell reselection when in the idle mode.

2. The method of claim 1, according to which at least some of the plurality of base stations which transmit reselection probabilities have more than one cell co-located therewith.

3. The method of claim 1, according to which the reselection probabilities in the set of reselection probabilities may express different probabilities for reselecting one and a same cell based on different factors such as quality of service or user terminal class, so that the set of reselection probabilities can be depicted as a two dimensional vector.

4. The method of claim 1, according to which the plurality of base stations which transmit reselection probabilities also transmit a factor which serves to avoid simultaneous cell reselection by user terminals in a cell.

5. The method of claim 4, according to which the factor is expressed as a probability factor for cell reselection.

6. The method of claim 1, according to which the set of reselection probabilities is transmitted as a broadcast message.

7. The method of claim 1 according to which the set of reselection probabilities is used by the user terminal for selecting between the plurality of cells which have other reselection parameters which are essentially equal.

8. A base station for use in a cellular wireless communications system, in which the cellular wireless communications system there is a plurality of cells, with a base station controlling traffic to and from user terminals in a cell, and in which the user terminals can assume an idle mode, where a user terminal when in an idle mode may perform a cell reselection procedure, comprising:

means for determining a set of reselection probabilities, each reselection probability in the set being a probability with which the user terminal when transitioning from the idle mode may carry out a reselection from a present cell to a cell to which the probability refers; and means for transmitting the set of reselection probabilities to the user terminals to perform cell reselection when in the idle mode.

9. The base station of claim 8, comprising means for having more than one cell co-located therewith.

10. The base station of claim 8, in which the reselection probabilities transmitted in the set of reselection probabilities may express different probabilities for reselecting one and a same cell based on different factors such as quality of service or user terminal class, so that the set of reselection probabilities can be depicted as a two dimensional vector.

11. The base station of claim 8, additionally comprising means for also transmitting a factor, which serves to avoid simultaneous cell reselection by user terminals in a cell.

12. The base station of claim 8, in which the set of reselection probabilities is transmitted as a broadcast message.

13. A user terminal for use in a cellular wireless communications system, in which the cellular wireless communications system there is a plurality of cells and a plurality of base stations, with each base station controlling traffic to and from user terminals in a cell, a user terminal being able to assume an idle mode, the user terminal being equipped with means for, when in the idle mode, performing a cell reselection procedure comprising an evaluation of different cells which are available to the user terminal, the user terminal comprising:

means for receiving a set of reselection probabilities, each reselection probability in the set being a probability with which the user terminal when transitioning from the idle mode may carry out a reselection from a present cell to a cell to which the probability refers; and using the set of reselection probabilities for performing cell reselection when in the idle mode.

14. The user terminal of claim 13, in which the means for receiving and for using the set of reselection probabilities are designed to handle different probabilities for reselecting one and a same cell based on different factors such as quality of service or user terminal class, so that the set of reselection probabilities which is received and used can be depicted as a two dimensional vector.

15. The user terminal of claim 13, in which the means for receiving and for using the set of reselection probabilities are also designed to receive and use a factor, which serves to avoid simultaneous cell reselection by user terminals in a cell.

16. The user terminal of claim 15, in which the factor can be used expressed as a probability factor for cell reselection.

17. The user terminal of claim 15, in which the set of reselection probabilities is received via a broadcast message.

* * * * *